United States Patent [19]
Tanaka et al.

[11] 4,437,112
[45] Mar. 13, 1984

[54] SOLID-STATE COLOR IMAGING APPARATUS

[75] Inventors: Nobuyoshi Tanaka; Seiji Hashimoto; Tetsuro Kuwayama, all of Yokohama, Japan

[73] Assignee: Canon Kabushiki Kaisha, Tokyo, Japan

[21] Appl. No.: 233,096

[22] Filed: Feb. 10, 1981

[30] Foreign Application Priority Data

| Feb. 15, 1980 | [JP] | Japan | 55-17968 |
| Apr. 18, 1980 | [JP] | Japan | 55-51224 |
| Apr. 21, 1980 | [JP] | Japan | 55-53302 |
| Apr. 21, 1980 | [JP] | Japan | 55-53309 |

[51] Int. Cl.³ .............................................. H04N 9/07
[52] U.S. Cl. ..................................................... 358/44
[58] Field of Search ....................................... 358/44, 48

[56] References Cited

U.S. PATENT DOCUMENTS 3,860,956  1/1975  Kubo et al. ............................ 358/44
4,214,264  7/1980  Hayward et al. ..................... 358/44

Primary Examiner—Richard Murray
Attorney, Agent, or Firm—Fitzpatrick, Cella, Harper & Scinto

[57] ABSTRACT

There is disclosed a solid-state color imaging apparatus which comprises an imaging device composed of a solid-state charge-coupled device having a plurality of cells each of which has at least two potential wells and color filter having a combination of color filter elements which are positioned corresponding to the two potential wells in such a manner as to provide different spectral sensitivities to the two potential wells.

24 Claims, 48 Drawing Figures

| R | Ma | B | /// |
|---|---|---|---|
| G | G | G | G |
| B | /// | R | Ma |
| G | G | G | G |
| R | Ma | B | /// |
| G | G | G | G |
| B | /// | R | Ma |
| G | G | G | G |

FIG. 7E

| R | B | Ma | /// |
|---|---|---|---|
| G | G | G | G |
| B | R | /// | Ma |
| G | G | G | G |
| R | B | Ma | /// |
| G | G | G | G |
| B | R | /// | Ma |
| G | G | G | G |

FIG. 7F

| Ye | W | Ye | W |
|---|---|---|---|
| G | G | G | G |
| Cy | G | Cy | G |
| G | G | G | G |
| Ye | W | Ye | W |
| G | G | G | G |
| Cy | G | Cy | G |
| G | G | G | G |

FIG. 8A

| Ye | G | Ye | G |
|---|---|---|---|
| G | W | G | W |
| Cy | G | Cy | G |
| G | G | G | G |
| Ye | G | Ye | G |
| G | W | G | W |
| Cy | G | Cy | G |
| G | G | G | G |

FIG. 8B

| Ye | G | Cy | G |
|----|---|----|----|
| G  | G | G  | G  |
| Cy | W | Ye | W  |
| G  | G | G  | G  |
| Ye | G | Ye | G  |
| G  | G | G  | G  |
| Cy | W | Cy | W  |
| G  | G | G  | G  |

FIG. 8C

| Ye | W | G  | G |
|----|---|----|---|
| G  | G | Ye | W |
| Cy | G | G  | G |
| G  | G | Cy | G |
| Ye | W | G  | G |
| G  | G | Ye | W |
| Cy | G | G  | G |
| G  | G | Cy | G |

FIG. 8D

| Ye | W | Cy | G |
|----|---|----|---|
| G  | G | G  | G |
| Cy | G | Ye | W |
| G  | G | G  | G |
| Ye | W | Cy | G |
| G  | G | G  | G |
| Cy | G | Ye | W |
| G  | G | G  | G |

FIG. 8E

| Ye | Cy | W | G |
|----|----|---|---|
| G  | G  | G | G |
| Cy | Ye | G | W |
| G  | G  | G | G |
| Ye | Cy | W | G |
| G  | G  | G | G |
| Cy | Ye | G | W |
| G  | G  | G | G |

| Ye | W | Ye | W |
|----|---|----|---|
| W  | W | W  | W |
| Cy | G | Cy | G |
| W  | W | W  | W |
| Ye | W | Ye | W |
| W  | W | W  | W |
| Cy | G | Cy | G |
| W  | W | W  | W |

FIG. 9B

| Ye | W | Ye | W |
|----|---|----|---|
| W  | W | W  | W |
| Cy | W | Cy | W |
| W  | G | W  | G |
| Ye | W | Ye | W |
| W  | W | W  | W |
| Cy | W | Cy | W |
| W  | G | W  | G |

FIG. 9C

| Ye | W | Cy | W |
|----|---|----|---|
| W  | W | W  | G |
| Cy | W | Ye | W |
| W  | G | W  | W |
| Ye | W | Cy | W |
| W  | W | W  | G |
| Cy | W | Ye | W |
| W  | G | W  | W |

FIG. 9D

| Ye | W | W  | W |
|----|---|----|---|
| W  | W | Ye | W |
| Cy | G | W  | W |
| W  | W | Cy | G |
| Ye | W | W  | W |
| W  | W | Ye | W |
| Cy | G | W  | W |
| W  | W | Cy | G |

| Ye | W | Cy | G |
|----|---|----|---|
| W  | W | W  | W |
| Cy | G | Ye | W |
| W  | W | W  | W |
| Ye | W | Cy | G |
| W  | W | W  | W |
| Cy | G | Ye | W |
| W  | W | W  | W |

| Ye | Cy | W  | G |
|----|----|----|---|
| W  | W  | W  | W |
| Cy | Ye | G  | W |
| W  | W  | W  | W |
| Ye | Cy | W  | G |
| W  | W  | W  | W |
| Cy | Ye | G  | W |
| W  | W  | W  | W |

| R | Ma | B | //// |
|---|----|---|------|
| G | G  | G | G    |
| B | //// | R | Ma |
| G | G  | G | G    |
| R | Ma | B | //// |
| G | G  | G | G    |
| B | //// | R | Ma |
| G | G  | G | G    |

FIG.11A

| B | Ma | B | Ma |
|---|----|---|----|
| G | G  | G | G  |
| R | //// | R | //// |
| G | G  | G | G  |
| B | Ma | B | Ma |
| G | G  | G | G  |
| R | //// | R | //// |
| G | G  | G | G  |

FIG.11B

| Cy | Ye | Cy | Ye |
|----|----|----|----|
| W  | G  | W  | G  |
| Cy | Ye | Cy | Ye |
| W  | G  | W  | G  |
| Cy | Ye | Cy | Ye |

FIG.12A

| R | Ma | R | Ma |
|---|----|---|----|
| G | G  | G | G  |
| B | //O// | B | //O// |
| G | G  | G | G  |
| R | Ma | R | Ma |
| G | G  | G | G  |
| B | //O// | B | G |
| G | G  | G | //O// |

FIG.12B

Figure 16:
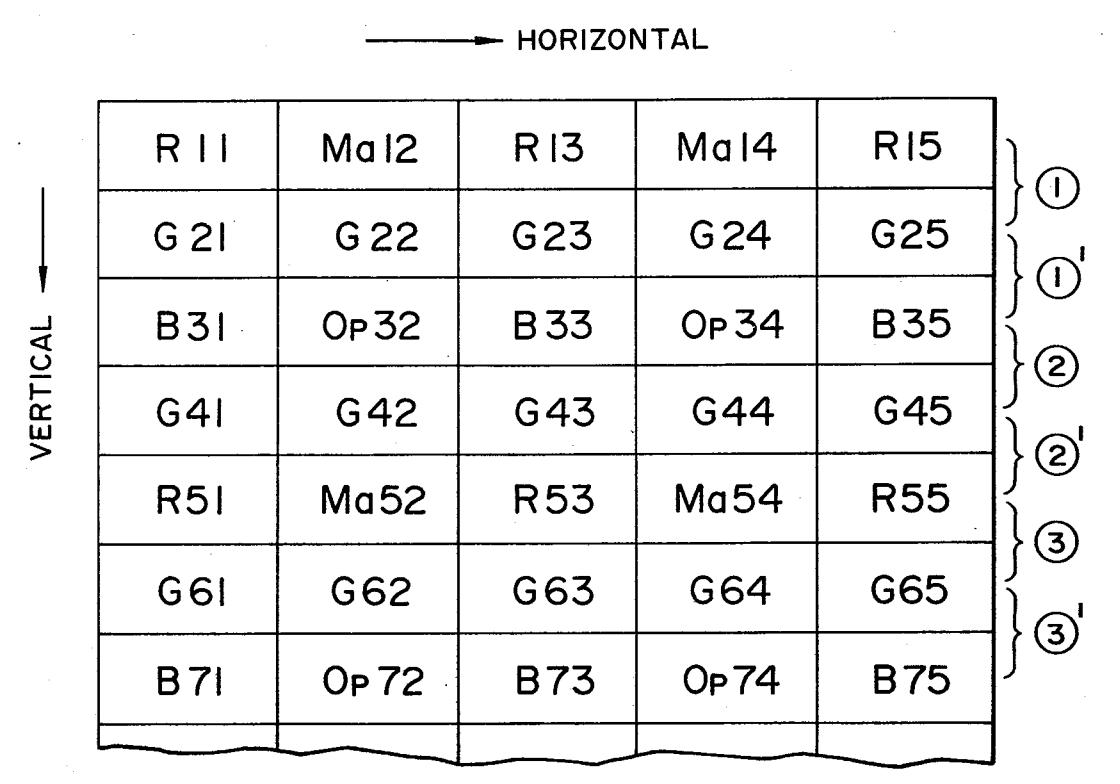

| R11 | Ma12 | R13 | Ma14 | R15 |
|---|---|---|---|---|
| G21 | G22 | G23 | G24 | G25 |
| B31 | Op32 | B33 | Op34 | B35 |
| G41 | G42 | G43 | G44 | G45 |
| R51 | Ma52 | R53 | Ma54 | R55 |
| G61 | G62 | G63 | G64 | G65 |
| B71 | Op72 | B73 | Op74 | B75 |

| $\bar{+}$ | $\bar{+}$ | $\bar{|}$ | $\bar{|}$ | o | o | o |
|---|---|---|---|---|---|---|
| $\bar{+}$ | $\bar{+}$ | $\bar{|}$ | $\bar{|}$ | o | o | o |
| $\bar{+}$ | $\bar{+}$ | $\bar{|}$ | $\bar{|}$ | o | o | o |
| $\bar{+}$ | $\bar{+}$ | $\bar{|}$ | $\bar{|}$ | o | o | o |
| $\bar{+}$ | $\bar{+}$ | $\bar{|}$ | $\bar{|}$ | o | o | o |

FIG. 17B

| o | $\bar{+}$ | $\bar{+}$ | $\bar{|}$ | $\bar{|}$ | o | o |
|---|---|---|---|---|---|---|
| o | $\bar{+}$ | $\bar{+}$ | $\bar{|}$ | $\bar{|}$ | o | o |
| o | $\bar{+}$ | $\bar{+}$ | $\bar{|}$ | $\bar{|}$ | o | o |
| o | $\bar{+}$ | $\bar{+}$ | $\bar{|}$ | $\bar{|}$ | o | o |
| o | $\bar{+}$ | $\bar{+}$ | $\bar{|}$ | $\bar{|}$ | o | o |

FIG. 17C

| o | o | $\bar{|}$ | $\bar{|}$ | $\bar{+}$ | $\bar{+}$ | o |
|---|---|---|---|---|---|---|
| o | o | $\bar{|}$ | $\bar{|}$ | $\bar{+}$ | $\bar{+}$ | o |
| o | o | $\bar{|}$ | $\bar{|}$ | $\bar{+}$ | $\bar{+}$ | o |
| o | o | $\bar{|}$ | $\bar{|}$ | $\bar{+}$ | $\bar{+}$ | o |
| o | o | $\bar{|}$ | $\bar{|}$ | $\bar{+}$ | $\bar{+}$ | o |

FIG. 17D

| o | o | o | $\bar{|}$ | $\bar{|}$ | $\bar{+}$ | $\bar{+}$ |
|---|---|---|---|---|---|---|
| o | o | o | $\bar{|}$ | $\bar{|}$ | $\bar{+}$ | $\bar{+}$ |
| o | o | o | $\bar{|}$ | $\bar{|}$ | $\bar{+}$ | $\bar{+}$ |
| o | o | o | $\bar{|}$ | $\bar{|}$ | $\bar{+}$ | $\bar{+}$ |
| o | o | o | $\bar{|}$ | $\bar{|}$ | $\bar{+}$ | $\bar{+}$ |

| $+\frac{1}{2}$ | $+\frac{1}{2}$ | $+\frac{1}{2}$ | $+\frac{1}{2}$ | $+\frac{1}{2}$ |
|---|---|---|---|---|
| $+\frac{1}{2}$ | $+\frac{1}{2}$ | $+\frac{1}{2}$ | $+\frac{1}{2}$ | $+\frac{1}{2}$ |
| $-1$ | $-1$ | $-1$ | $-1$ | $-1$ |
| $-1$ | $-1$ | $-1$ | $-1$ | $-1$ |
| $+\frac{1}{2}$ | $+\frac{1}{2}$ | $+\frac{1}{2}$ | $+\frac{1}{2}$ | $+\frac{1}{2}$ |
| $+\frac{1}{2}$ | $+\frac{1}{2}$ | $+\frac{1}{2}$ | $+\frac{1}{2}$ | $+\frac{1}{2}$ |
| 0 | 0 | 0 | 0 | 0 |
| 0 | 0 | 0 | 0 | 0 |

FIG. 20A

| 0 | 0 | 0 | 0 | 0 |
|---|---|---|---|---|
| 0 | 0 | 0 | 0 | 0 |
| $-\frac{1}{2}$ | $-\frac{1}{2}$ | $-\frac{1}{2}$ | $-\frac{1}{2}$ | $-\frac{1}{2}$ |
| $-\frac{1}{2}$ | $-\frac{1}{2}$ | $-\frac{1}{2}$ | $-\frac{1}{2}$ | $-\frac{1}{2}$ |
| $+1$ | $+1$ | $+1$ | $+1$ | $+1$ |
| $+1$ | $+1$ | $+1$ | $+1$ | $+1$ |
| $-\frac{1}{2}$ | $-\frac{1}{2}$ | $-\frac{1}{2}$ | $-\frac{1}{2}$ | $-\frac{1}{2}$ |
| $-\frac{1}{2}$ | $-\frac{1}{2}$ | $-\frac{1}{2}$ | $-\frac{1}{2}$ | $-\frac{1}{2}$ |

| B | Ma | B | Ma |
|---|----|---|----|
| G | G | G | G |
| R | /// | R | /// |
| G | G | G | G |
| B | Ma | B | Ma |
| G | G | G | G |
| R | /// | R | /// |
| G | G | G | G |

FIG. 21B

| R | G | R | G |
|---|---|---|---|
| G | Ma | G | Ma |
| B | G | B | G |
| G | /// | G | /// |
| R | G | R | G |
| G | Ma | G | Ma |
| B | G | B | G |
| G | /// | G | /// |

FIG. 21C

| R | G | B | G |
|---|---|---|---|
| G | Ma | G | /// |
| B | G | R | G |
| G | /// | G | Ma |
| R | G | B | G |
| G | Ma | G | /// |
| B | G | R | G |
| G | /// | G | Ma |

FIG. 21D

| R | Ma | G | G |
|---|----|---|---|
| G | G | R | Ma |
| B | /// | G | G |
| G | G | B | /// |
| R | Ma | G | G |
| G | G | R | Ma |
| B | /// | G | G |
| G | G | B | /// |

SOLID-STATE COLOR IMAGING APPARATUS

BACKGROUND OF THE INVENTION

1. Field of the Invention

The present invention relates to a solid-state color imaging apparatus for obtaining color image signals by means of a solid-state device.

2. Description of the Prior Art

There is already proposed the use of one, two or three charge-coupled devices (CCD) for realizing a solid-state color imaging apparatus, but the present invention relates particularly to a single-chip imaging process and an apparatus therefor employing a CCD.

In the conventional single-chip solid-state imaging apparatus utilizing a solid-state imaging device such as CCD, the color separation has been achieved by superposing a color filter array in one-to-one relationship with imaging cells. The color filter array used in such single-chip solid-state imaging apparatus is generally composed of a color filter having a color mosaic pattern as shown in FIG. 1 in order to reduce the number of imaging cells of CCD. The color filter array shown in FIG. 1, is of so-called Bayer arrangement, having color filter elements 1, 2 and 3 respectively transmitting red (R), blue (B) and green (G) color components. Such color filter array has been associated with unsecure color separation due to mutual color mixing caused by signal leak between the CCD cells even if the color filter elements 1, 2, 3 are completely aligned with said cells.

Particularly in case of a frame transfer type CCD, said color mixing amounts to a considerable extent because of the structure, as will be explained in the following.

FIGS. 2(a) and 2(b) respectively show a vertical cross-sectional view of a 4-phase drive frame-transfer CCD for imaging by signal accumulation under two of four electrodes, and a chart showing the probability of charge capture.

Also FIGS. 3(a) and 3(b) respectively show a cross-sectional view in the horizontal direction and a chart showing the probability of charge capture.

In FIGS. 2(a) and 3(a) there are shown transfer electrodes 4 grouped in a set of $\phi1$, $\phi2$, $\phi3$ and $\phi4$ for 4-phase drive for each cell; an insulating layer 5; and a silicon substrate 6. 7 indicates a potential curve having potential wells 8 and potential barriers 9 formed by the voltages applied to said transfer electrodes. Also there are shown channel stoppers 10. In the illustrated state the potential well or photoreceptor cell 8 is formed in a space defined by said channel stoppers 10 and the potential barriers 9 positioned under the transfer electrodes $\phi3$ and $\phi4$.

FIGS. 2(b) and 3(b) show the probability distributions g(x), h(y) of capturing the charge generated by photoelectric conversion into the photoreceptor cell 8 formed by potential curve 7.

Said probability distributions g(x), h(y) indicate that the photosensitivity curves of neighboring photoreceptor cells 8 mutually overlap at the potential barriers 9 under the channel stopper 10 and under the transfer electrodes 4 ($\phi3$, $\phi4$), whereby a color mixing appears between the adjacent cells even if the color filter elements 1, 2, 3 are exactly aligned with the imaging cells.

Such color mixing can be eliminated with respect to the horizontal direction of a 2-dimensional CCD by rendering the channel stopper 10 opaque to light. However, with respect to the vertical direction, the transfer electrodes 4 cannot be made opaque for enabling interlaced imaging, whereby the color filter of the mosaic pattern shown in FIG. 1 results in an inevitable color mixing as high as approximately 25%. Since such color mixing can only be eliminated by a considerably complicated correcting circuit, it is not practically acceptable to combine the frame-transfer CCD with filter of the Bayer arrangement as shown in FIG. 1.

Also the color camera using CCD has generally been associated with a poor sensitivity, as the electrodes $\phi1$, $\phi2$, $\phi3$ and $\phi4$ have usually been prepared with polysilicon having a poor transmission to blue component.

Furthermore, as the solid-state color imaging apparatus functions in the normal operation at approximately $\frac{1}{8}$ of the saturation level of the imaging device, an incident light of the saturation level can be regarded as a strong white light, whereby the corresponding signal is generally white clipped by the signal processing circuit. However, in case of the single-chip apparatus, the coded output signals Y, R and B assume the behavior as shown in FIG. 3(b) whereby the output signals R and B decline in response to incident light exceeding the saturation level of the cells corresponding to (Ma+G). Consequently the white slipping is not applied to said signals R and B giving rise to non-zero levels for the color difference signals (R−Y) and (B−Y), whereby the obtained image does not become white when CCD is saturated.

Furthermore, the combination of mosaic color filter with frame-transfer CCD, though allowing to avoid the drawback of color mixing, will lead to the formation of false color signals under certain conditions.

SUMMARY OF THE INVENTION

The object of the present invention is to provide a color imaging apparatus not associated with the above-mentioned drawbacks.

Another object of the present invention is to provide a color filter arrangement allowing easy compensation of color mixing when combined with a frame-transfer CCD and a color imaging apparatus utilizing such color filter arrangement.

Still another object of the present invention is to provide a color imaging apparatus capable of forming in each cell at least two potential wells respectively corresponding to different filter elements and mixing the signal charges accumulated in said potential wells to obtain an output signal.

Still another object of the present invention is to provide an imaging apparatus composed of an imaging device having plural cells each capable of forming at least two potential wells, and of a color filter adhered on said device and having a combination of color filter elements representing mutually different four spectral characteristics and light-shielding filter elements.

Still another object of the present invention is to provide a color imaging apparatus composed of an imaging device having plural cells each capable of forming at least two potential wells and of a color filter adhered on said device and having a combination of color filter elements representing mutually different four spectral characteristics and light-shielding filter elements, wherein said color filter having four different spectral characteristics is composed of filter elements respectively transmitting red, blue, green and magenta components or yellow, white, cyan and green components.

Still another object of the present invention is to provide a color imaging apparatus utilizing CCD wherein a part or all of electrodes thereof is composed of transparent electrodes.

Still another object of the present invention is to provide a color imaging apparatus of an elevated sensitivity by means of an improved layout of color filter to be adhered on an imaging device capable of forming potential wells with different photoelectric converting sensitivities.

Still another object of the present invention is to provide an imaging apparatus with reduced blooming phenomenon.

Still another object of the present invention is to provide a solid-state color imaging apparatus provided with means for generating luminance signal, red component signal and blue component signal by reading signal charges from each cell of a solid-state imaging device combined with color filter elements, wherein a detection signal is formed from a signal read from said solid-state imaging device and a signal corresponding to the saturation level of said solid-state imaging device and is added to said luminance signal, red component signal and blue component signal.

Still another object of the present invention is to provide a color imaging apparatus capable of preventing formation of false signal in a particular color component in response to an input image having a low spatial frequency in the vertical direction.

Still another object of the present invention is to provide a color imaging apparatus allowing easy compensation of color in the use of a frame-transfer CCD and capable of preventing formation of false signal in particular color component in response to an input image having a low spatial frequency in the vertical direction.

Still another object of the present invention is to provide a solid-state color imaging apparatus provided with means for accumulating charges in at least two independent potential wells in each cell of a solid-state imaging device corresponding to different color filter elements and adapted to mix signal charges accumulated in said two potential wells and to process the signal obtained from thus mixed charges thereby obtaining the luminance signal and color component signals for color television, wherein the coefficient to be multiplied on the output of said cell is so determined that the effective sensitivity distribution in the imaging frame is substantially symmetrical in the vertical direction.

Still another objects of the present invention will be made apparent from the description of embodiments thereof be taken in conjunction with the attached drawings.

BRIEF DESCRIPTION OF THE DRAWINGS

FIG. 3(a) is a cross-sectional view in horizontal direction similar to FIG. 2(a);

FIGS. 7A to 7F are views of color filter for use in other embodiments;

FIGS. 8A to 8F are views of color filter for use in still other embodiments;

FIGS. 9A to 9F are views of color filter for use in still other embodiments;

FIG. 10 is a cross-sectional view showing an example of 1-phase drive frame-transfer CCD;

FIGS. 11A and 11B are views of color filter for use in still other embodiments;

FIGS. 12A and 12B are views of color filter;

FIG. 16 is a view of filter color layout in another embodiment, wherein each color filter component is represented by a number;

FIGS. 17A to 17D are views showing the sign of coefficient to be multiplied on the output from each potential well for obtaining a red component signal in case of the color filter layout shown in FIG. 16;

FIGS. 20A and 20B are charts showing the sign of coefficient to be multiplied on the output signal from each potential well for obtaining color component signals in the embodiments of the present invention;

FIGS. 21A to 21D are views of color filter layout applicable in the present invention.

DESCRIPTION OF THE PREFERRED EMBODIMENTS

Figure 1:
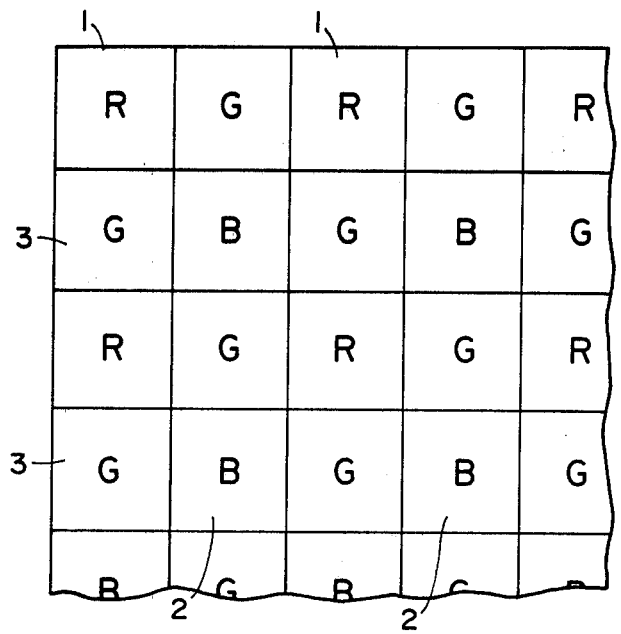
FIG. 1 is a plan view of a mosaic color filter of Bayer layout.
Figure 2:
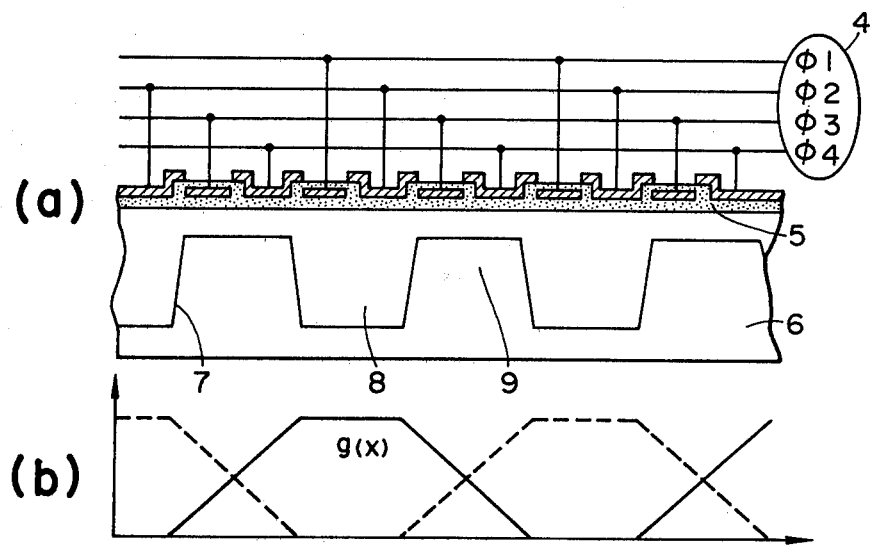
FIG. 2(a) is a cross-sectional view in vertical direction of a 4-phase drive CCD in imaging operation by accumulating charges under two or every four electrodes.
FIG. 2(b) is a chart showing probability of charge capture.
Figure 3:
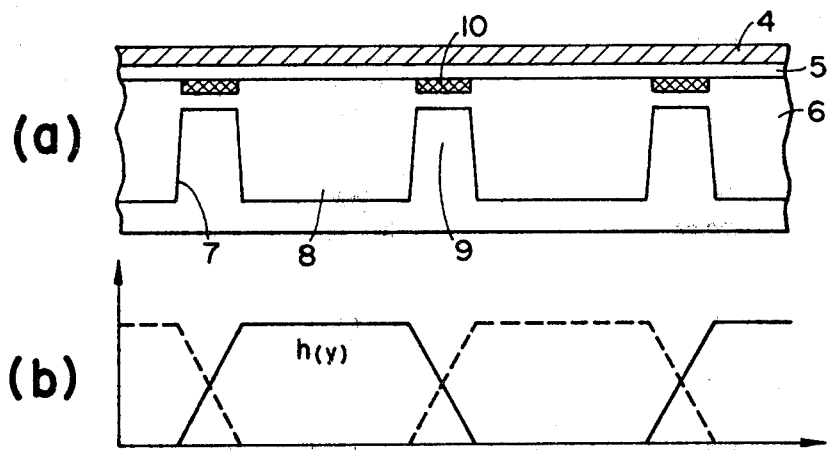
FIG. 3 (b) is a chart showing the probability of charge capture.
Figure 4:
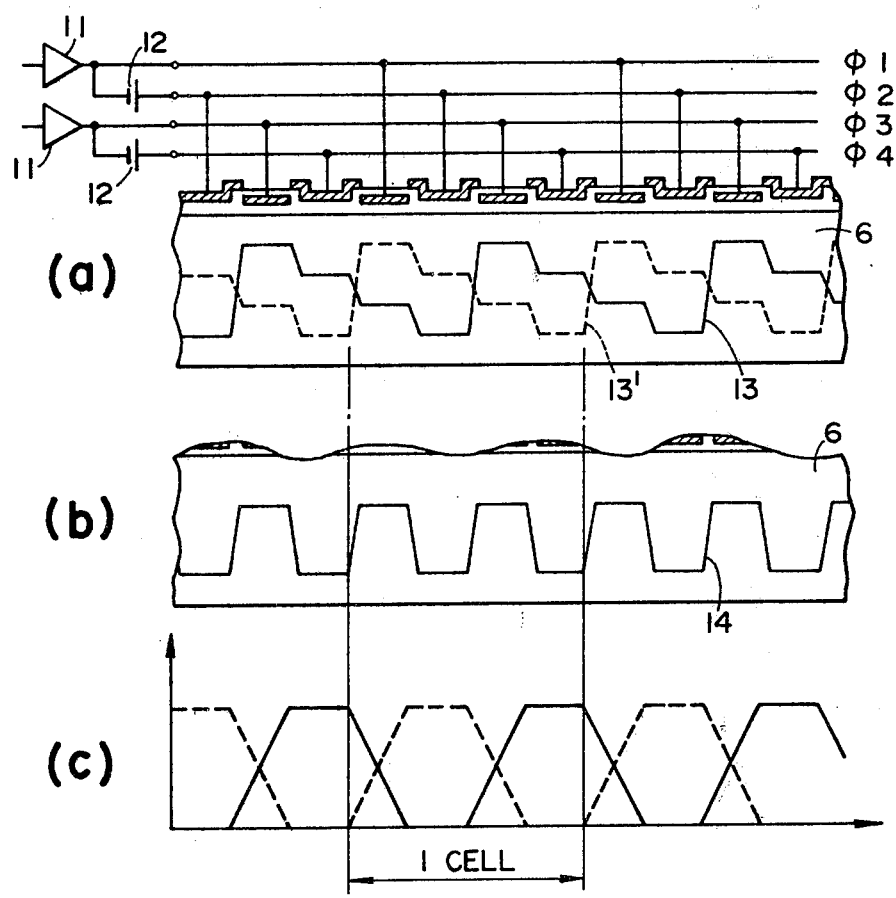
FIGS. 4(a), 4(b) and 4(c) are views showing a solid-state imaging device for use in an embodiment of the solid-state color imaging apparatus of the present invention.

Now the present invention will be clarified in detail by embodiments thereof. FIG. 4 shows a 4-phase drive CCD for explaining an embodiment of the present invention, wherein a potential pattern 13, shown in FIG. 4(a) is formed by DC bias voltages 12 applied to drivers 11. The bottom of each potential well is formed as a staircase shape descending in the charge transfer direction by means of said bias voltages. A broken-lined potential pattern 13' indicates a state in which the phase of transfer pulse is shifted by 180°. The potential pattern of the descending staircase shape as shown in FIG. 4(a) is also achievable in a 2-phase or 1-phase drive CCD. The present invention is naturally applicable also to such CCD, through the following description will be concentrated on a 4-phase drive CCD.

The potential pattern of the above-explained pattern essentially required for charge transfer, can be modified into a state shown in FIG. 4(b) in the state of charge accumulation by applying suitable voltages to the transfer electrodes. FIG. 4(c) shows the probability distribution of charge capture in such state.

Figure 5:
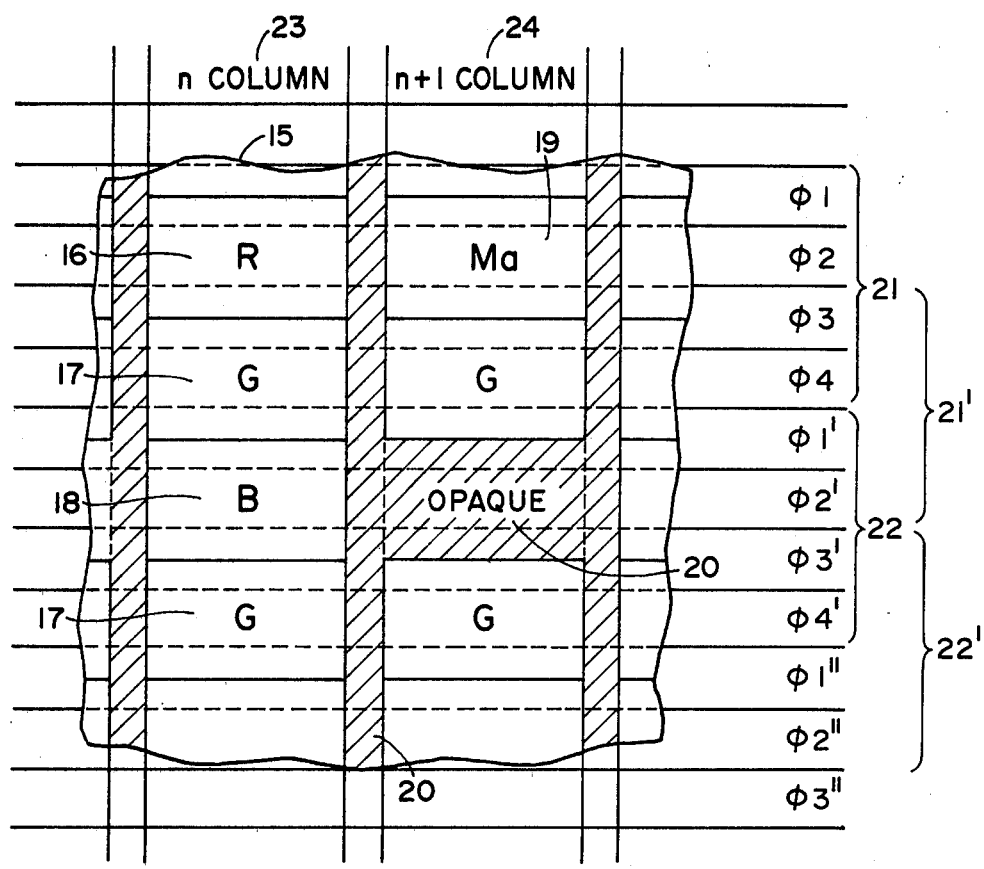
FIG. 5 is a view showing the solid-state imaging device and color filter to be employed in said embodiment.

The above-explained CCD is combined with a color filter 15 having an element layout as shown in FIG. 5 wherein each color filter element is displaced by a half pitch in the vertical direction with respect to the electrodes.

The illustrated set of filter elements are repeatedly provided in the horizontal and vertical directions, and the numerals 16, 17, 18 and 19 represent color filter elements respectively transmitting red (R), green (G), blue (B) and magenta (Ma) component while the numeral 20 represents an opaque element and a light-shield layer provided at the channel stopper. As will be seen from FIG. 5, the color filter is so structured as to position two different color filter elements on each cell composed of four electrodes $\phi 1$, $\phi 2$, $\phi 3$ and $\phi 4$.

In FIG. 5, the corresponding electrodes belonging to different cells are represented by prime marks, such as $\phi 1$, $\phi 1'$ and $\phi 1''$.

When a potential pattern as shown in FIG. 4(b) is formed on the above-explained color imaging device, the potential well for example under the electrode $\phi 2$ in the n-th column 23 accumulates the signal charge corresponding to the light component transmitted by the red color filter element 16, and, as will be understood from the probability distribution of charge capture shown in FIG. 4(c), a signal charge generated by the light component transmitted by the green color filter elements 17 positioned above and below said element 16, thus giving rise to a mixed color component. Let us now represent the charge corresponding to a pure color component transmitted by a color filter element and accumulated in the potential well thereunder by lower case letters r, g, b, ma or opaque, and the leak rate of mixed color component by a coefficient $\alpha$. Thus the charge accumulated in the potential well under the electrode $\phi 2$ in the n-th column is given by:

$$r' = r + 2\alpha \cdot g \qquad (1)$$

Similarly the charge in the potential well under the electrode $\phi 4$ in the n-th column is given by:

$$g' = \alpha \cdot r + g + \alpha \cdot b \qquad (2)$$

The charge in the potential well under the electrode $\phi 2'$ in the n-th column is given by:

$$b' = 2\alpha \cdot g + b \qquad (3)$$

The charge in the potential well under the electrode $\phi 4'$ in the n-th column is given by:

$$g' = \alpha \cdot r + g + \alpha \cdot b \qquad (4)$$

The charge in the potential well under the electrode $\phi 2$ in the (n+1)-th column 24 is given by:

$$ma' = ma + 2\alpha \cdot g \qquad (5)$$

The charge in the potential well under the electrode $\phi 4$ in the (n+1)-th column is given by:

$$g' = \alpha \cdot ma + g \qquad (6)$$

The charge in the potential well under the electrode $\phi 2'$ in the (n+1)-th column is given by:

$$opaque' = 2\alpha \cdot g \qquad (7)$$

The charge in the potential well under the electrode $\phi 4'$ in the (n+1)-th column is given by:

$$g' = \alpha \cdot ma + g \qquad (8)$$

After the charge accumulation in the foregoing manner in the charge accumulation mode, the transfer pulse voltages applied to the electrodes are changed to modify the potential pattern from the state shown in FIG. 4(b) to the descending staircase pattern 13' in FIG. 4(a) for signal reading in the signal transfer mode. In this state the charge r' accumulated in the potential well under the electrode $\phi 2$ in the n-th column and the charge g' under the electrode $\phi 4$ in the same column are united and accumulated in a potential well newly formed under the electrode $\phi 4$. Also the charge ma' accumulated in the potential well under the electrode $\phi 2$ in the (n+1)-th column and the charge g' under the electrode $\phi 4$ in the same column are united and accumulated in a potential well formed under the electrode $\phi 4$.

Consequently a horizontal line 21 composed of the electrodes $\phi 1$, $\phi 2$, $\phi 3$ and $\phi 4$ provides the signals r'+g' and ma'+g' alternately, while another horizontal line 22 composed of the electrodes $\phi 1'$, $\phi 2'$, $\phi 3'$ and $\phi 4'$ provides the signals b'+g' and opaque'+g' alternately.

In the interlaced drive the transfer pulse voltages are so changed as to obtain a potential pattern 13 shown in FIG. 4(a). Thus a horizontal line 21' composed of the electrodes $\phi 3$, $\phi 4$, $\phi 1'$ and $\phi 2'$ provides the signals b'+g' and opaque'+g' alternately, while another horizontal line 22' composed of the electrodes $\phi 3'$, $\phi 4'$, $\phi 1''$ and $\phi 2''$ provides the signals r'+g' and ma'+g' alternately.

Figure 6:
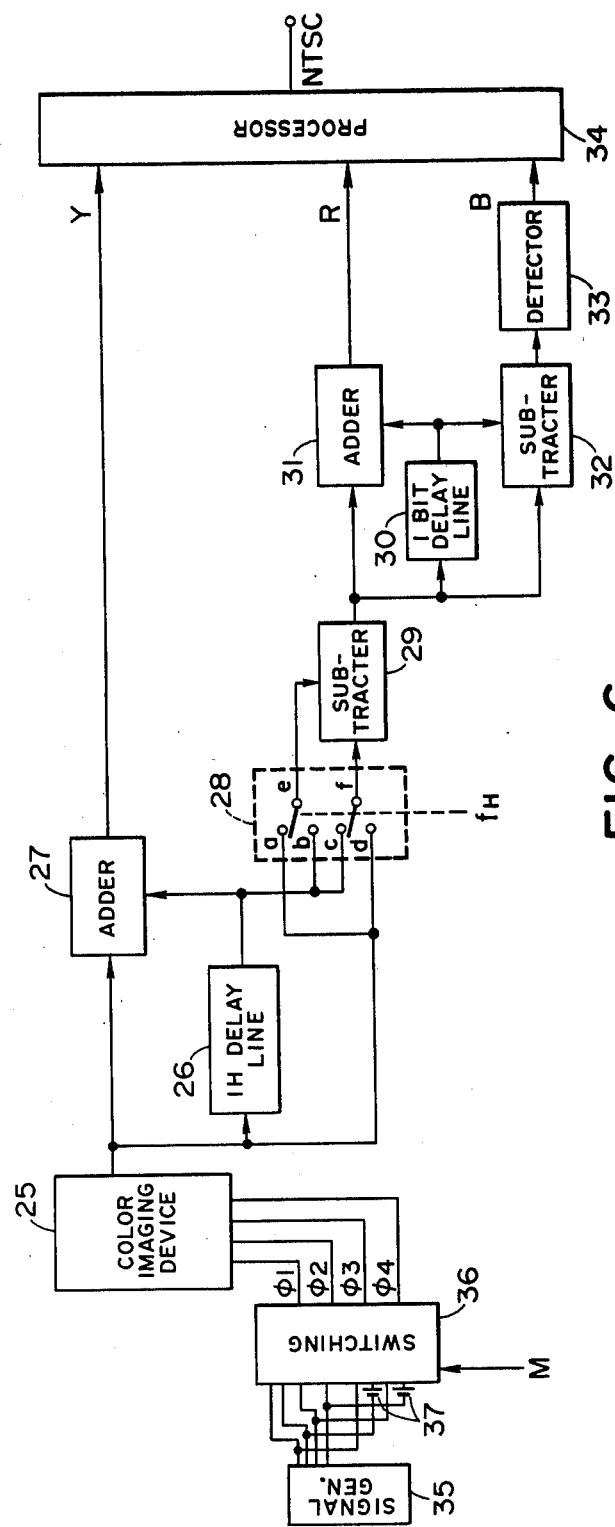
FIG. 6 is a block diagram showing the signal processing circuit to be employed in said embodiment.

FIG. 6 shows a block diagram of a control circuit for obtaining color signals from the output signals provided in the above-explained manner by the color imaging device.

In FIG. 6 there are shown a signal generator 35 for generating electrode drive signals $\phi 1$-$\phi 4$;

a switching circuit 36 for supplying said drive signals $\phi 1$-$\phi 4$ from the signal generator 35, with or without DC bias voltages 37, to the color imaging device 25 suitably in the transfer or accumulation mode in response to a mode signal M;

a delay line 26 for delaying the signals by one horizontal scanning time and obtaining the luminance signal Y, red component signal R and blue component signal B through the vertical correlation of the signals; and the color imaging device 25 composed, as already explained in relation to FIG. 5, of a mosaic color filter and a CCD. The output signal from the device 25 is introduced to an adder 27, the delay line 26 and input terminals a, b of a switching circuit 28, and the output signal from said delay line 26 is introduced to said adder 27 and input terminals b, c of said switching circuit 28.

The signal obtained from the adder 27 for the n-th column is given by the foregoing equations (1) to (4), and, by representing the signal level with uppercase letters corresponding to each signal charge, can be expressed as:

$(R'+G')+(B'+G')=(1+2\alpha)(R+2G+B),$ and for the (n+1)-th column, from the equations (5) to (8):

$(Ma'+G')+(Opaque'+G')=(1+2\alpha)(Ma+2G)$ which is also usable as the luminance signal Y since $Ma=R+B$.

From the foregoing result it will be understood that the effect of color mixing is not significant as the luminance signal $(R+2G+B)$ is merely multiplied by a coefficient $(1+2\alpha)$. Also the presence of luminance signal for each clock pulse suggests the possibility of obtaining a sufficiently high resolving power even with a CCD having a relatively limited number or pixels in the horizontal direction.

Output terminals e, f of the switching circuit 28 are simultaneously connected respectively to the input terminals a, c for a horizontal scanning time 1H, and to the input terminals b, d for a next horizontal scanning time. The fH in FIG. 6 represents the horizontal scanning frequency. Said output terminals e, f are respectively connected to the plus and minus input terminals of a subtracter 29, which therefore provides alternate signals $(R'+G')-(B'-G')=R-B$ and $(Ma'+G')-(Opaque'+G')=Ma$. The switching circuit 28 functions to avoid the formation of inverted signals B−R or −Ma. As will be understood from the foregoing explanation, the mixed color components are completely excluded in the subtraction process.

The output signal from said subtracter 29 is supplied to an adder 31, a 1-bit delay line 30 for delaying the signal by a time corresponding to an adjacent cell, and a subtracter 32, and the output signal from said delay line 30 is supplied to said adder 31 and subtracter 32. In this manner the adder 31 provides the red component signal R, and the subtracter 32 alternately provides positive and negative blue component signals which are rectified by a product detector 33 to obtain the blue component signal B.

The signals Y, R and B thus obtained are supplied to a processor 34 composed of low-pass filters, r-compensating circuit, matrix circuit and color encoder to obtain an NTSC color video signal.

The color layout shown in FIG. 5 as the repeating unit in the horizontal and vertical directions can be modified in various manners, some of which are shown in FIGS. 7A to 7F.

Figure 7A:
Figure 7B:
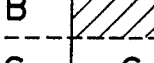
Figure 7C:
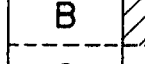
Figure 7D:
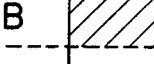

The layout shown in FIG. 7A is obtained by simply repeating the basic layout of FIG. 5 in both directions. However an improvement on certain properties is achievable by checkerboard arrangement of the green elements G. The layouts shown in FIGS. 7B, 7C and 7D are variations of that shown in FIG. 7A and are capable of providing color signals by certain modifications in the signal processing shown in FIG. 6. These layouts shown in FIGS. 7A to 7D are all practically acceptable though they mutually differ to some extent with respect to the preparation of color filter, image resolving power, degree of moire pattern generation etc.

FIG. 7E shows a layout in which the vertical resolving is improved by modified arrangement of red elements in the vertical direction.

Also FIG. 7F shows a color filter layout capable of reducing image jitter at the image edge portion.

Furthermore FIGS. 8A to 8F show color filter layouts utilizing the combinations of pure colors and complementary colors for improving the sensitivity, with corresponding characteristics to those shown in FIGS. 7A to 7F. Also FIGS. 9A to 9F show color filter layouts allowing easier preparation of the color filter.

In CCD as explained in the foregoing, the electrodes $\phi1$, $\phi2$, $\phi3$ and $\phi4$ have mostly been prepared with polysilicon having considerably poor transmittance to blue light component, leading to the insufficient sensitivity of the color camera utilizing such CCD. Such insufficient blue sensitivity can be improved by replacing a part or all of said electrodes with transparent electrodes, for example preparing the electrodes $\phi2$ and $\phi4$ with $SnO_2$ transparent electrodes.

In such case the equations (1) to (8) become more complex, but the elimination of mixed color components can still be achieved in the process for separating color signals.

Figures 9E, 9F, 10:
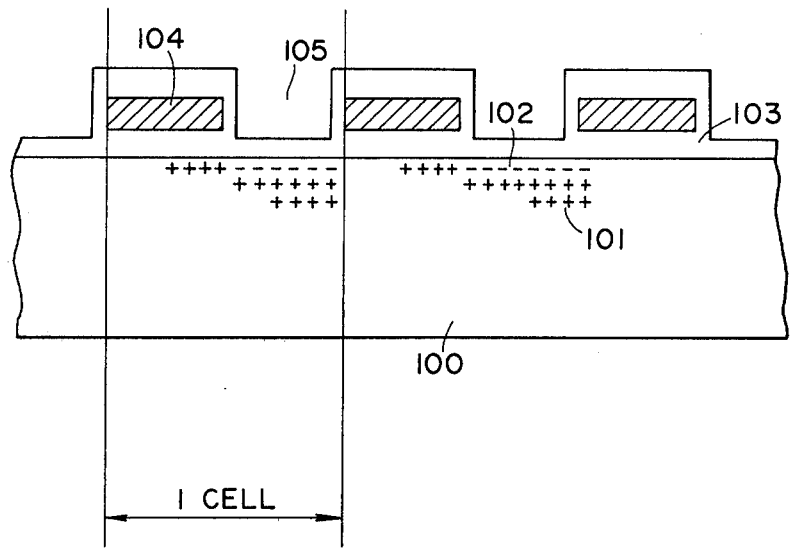

Also loss in blue sensitivity can be prevented by combining a 1-phase drive frame-transfer CCD with a filter of a particular color element layout. Such 1-phase drive CCD has a cross-sectional structure as shown in FIG. 10, wherein a P-type silicon substrate 100 is provided with donor and acceptor ions 101, 102 doped in the illustrated patterns to achieve a staircase potential pattern as shown in FIG. 4(a) by 1-phase drive, and is further provided with a silicon insulating layer 103 and polysilicon electrodes 104.

Thus, in such CCD, each cell is half covered by a polysilicon electrode 104 but the remaining half 105 (hereinafter called transparent area) is not covered by polysilicon. Although the detailed function of said CCD will be omitted in the present description, the potential pattern is formed as a descending staircase shape as shown by 13, 13' in FIG. 4(a) in the charge transfer mode and as a well shape 14 in the charge accumulation mode. Because of the considerably different spectral transmissions between the polysilicon electrode area and the transparent area, the color layouts shown in FIGS. 7B, 7C and 7D are no longer applicable and have to that shown in FIG. 7A or the variations thereof as shown in FIGS. 11A and 11B, all of which have linearly arranged green elements in the horizontal direction. The color filter is so positioned that the blue elements B are present on the transparent areas 105 and the green elements G are present on the polysilicon electrodes 104 thereby achieving an efficient photoelectric conversion since the polysilicon electrode 104 has considerable transmittance to the green light component and the blue component need not be transmitted by the polysilicon layer. In this manner a color imaging apparatus with improved blue sensitivity can be obtained by employing the above-mentioned CCD and color filter in combination as the imaging device 25 shown in FIG. 5. In this case, however, the CCD is controlled by 1-phase drive instead of 4-phase drive.

As the color filter elements are displacedly positioned with respect to the imaging cells as already explained in relation to FIG. 5, the green filter elements G partly cover the transparent areas of CCD. For this reason the equations (1) to (8) assume more complex form, but the mixed color components are again eliminated in the process of separating color signals.

The foregoing second embodiment of the present invention is applicable, as explained above, also to a frame-transfer CCD the surface of which is partly covered by polysilicon electrodes and partly occupied by transparent areas, and allows to provide a solid-state color imaging apparatus of significantly improved sensitivity as the blue filter elements can be positioned outside the polysilicon electrodes of poor transmittance to the blue light component.

In the conventional three-chip color imaging apparatus, the white clipping has been easily achieved even when the imaging devices are saturated because of the use of three solid-state imaging devices for green, red and blue with matched sensitivity. However, with the recent development of CCD provided with a color filter utilizing the combination of pure color elements and complementary color elements, the white clipping becomes difficult because of the difference in saturation light levels of the cells caused by the different color filter elements.

As an example, the aforementioned embodiment can be combined with a color filter as shown in FIG. 12A or 12B wherein R stands for red element, G for green, B for blue, O for opaque, Cy for cyan, W for white, Ye for yellow and Ma for magenta. The color components transmitted by such filter elements are processed by the circuit shown in FIG. 6 to obtain the luminance signal Y and color component signals R, B by signal delay in the delay line for a horizontal scanning time and by signal correlation in the vertical direction. In such processing the luminance signal is obtained from each row as:

$$(R+G)+(B+G) \text{ or } (Ma+G)+(G+O),$$

and the red signal R and blue signal B are obtained, as the sum and difference between the adjacent bits, from a signal obtained by subtraction of said 1H-delayed signal.

Figure 13A:
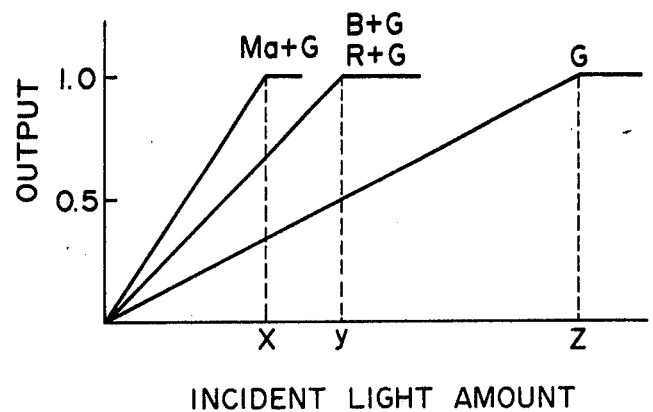
FIGS. 13A and 13B are charts showing output characteristics of a CCD having a color filter.
Figure 13B:
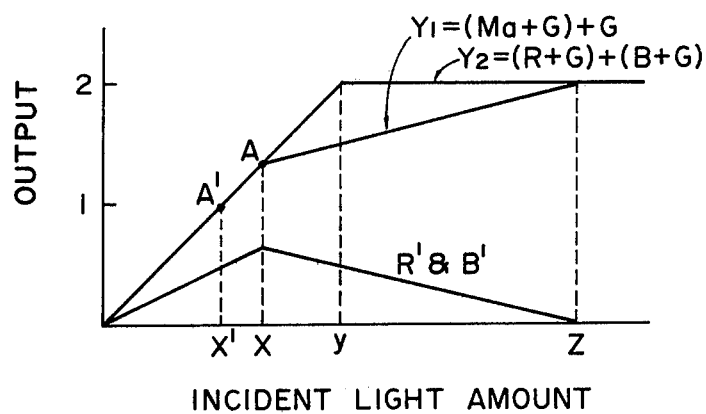

Now let us consider the dynamic ranges of the signals Y, R and B in relation to FIGS. 13A and 13B, showing the CCD output signals through a color filter as shown in FIG. 12 in response to white light, when the components R, G and B respectively represent 25% in the luminance signal $Y=R+2G+B$.

FIG. 13A shows the CCD output level in the ordinate, in which the level "1" indicates the saturation level of the photosensitive cell, as a function of relative incident light amount in the abscissa.

Also FIG. 13B shows the output signals obtained from the signals (M+G), (R+G), (B+G) and G shown in FIG. 13A through the processing system shown in FIG. 6, according to the following processes:

$$R' = \{(R+G)-(B+G)\}+\{(Ma+G)-G\} = 2R$$

$$B' = \{(B+G)-(R+G)\}+\{(Ma+G)-G\} = 2B$$

$$Y1 = \{(Ma+G)+G\}$$

$$Y2 = \{(R+G)+(B+G)\}$$

Thus, as shown in FIG. 13A, the incident light amount corresponding to the output saturation level becomes different according to the corresponding color filter element. Consequently, as shown in FIG. 13B, it becomes no longer possible to obtain correct Y, R and B signals above an incident light amount X at which the photosensitive cells corresponding to filter elements Ma and G become saturated.

The solid-state color imaging apparatus is generally used, in normal operation, for example in the order of ⅛ of the saturation level of photosensitive cells, and an incident light corresponding to the saturation level is regarded as a strong white light and is usually white clipped in the signal processing system. However, in a single-chip imaging apparatus, the coded output signals Y, R and B show the behavior as shown in FIG. 13B, resulting in a decrease in the output levels of signals R and B above an incident light amount at which the photosensitive cells corresponding to (Ma+G) become saturated. Consequently said signals R and B are not white clipped, so that the color difference signals $(R-Y)$ and $(B-Y)$ do not reach zero, thus leading to a non-white image when the CCD is saturated.

Figure 14:
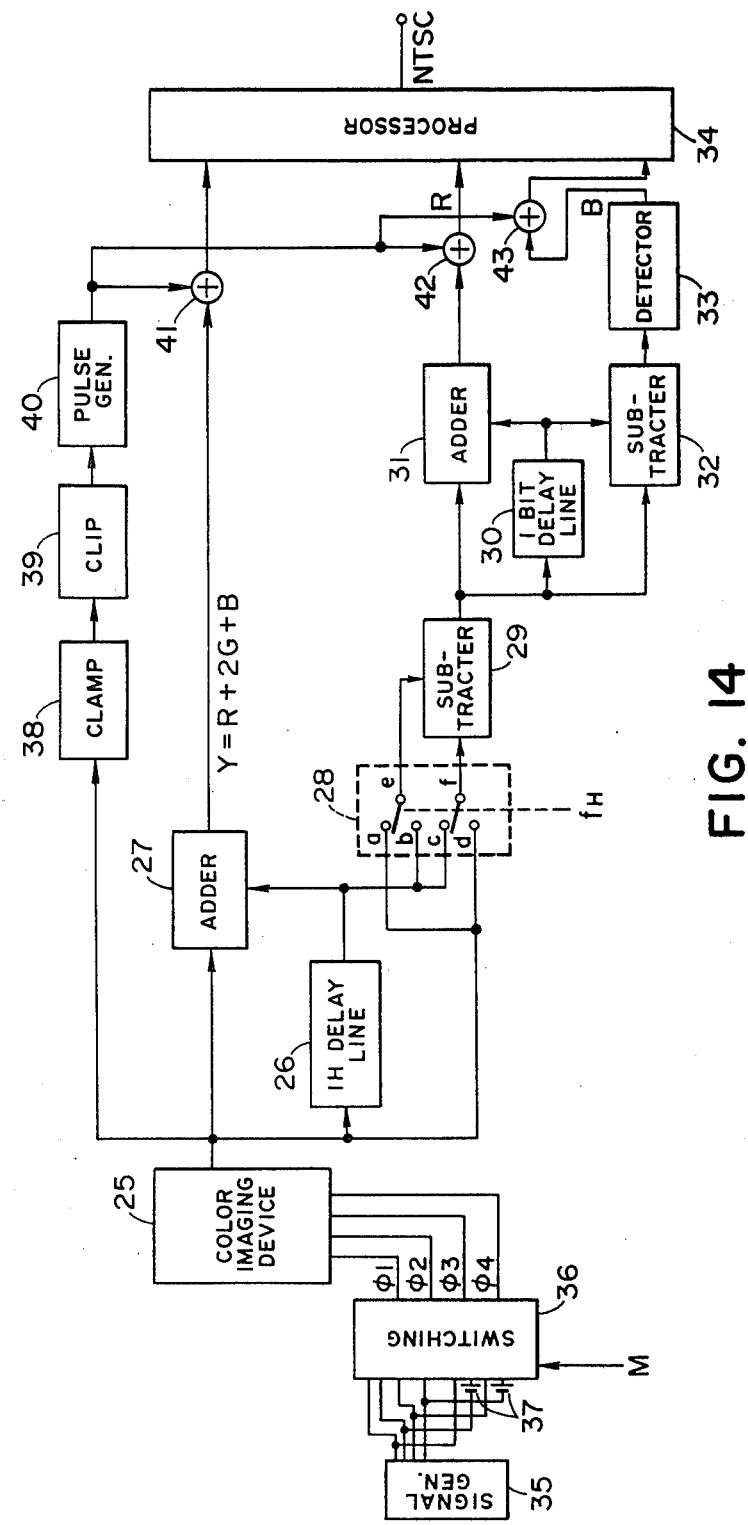
FIG. 14 is a block diagram showing an embodiment of the present invention.

The above-mentioned drawback can be prevented by another embodiment of the present invention shown in a block diagram in FIG. 14, wherein the same components as in FIG. 6 are represented by same numerals.

In FIG. 14 there are shown a signal generator 35 for generating electrode drive signals $\phi 1$-$\phi 4$;

a switching circuit 36 for supplying said drive signals $\phi 1$-$\phi 4$ from the signal generator 35, with or without DC bias voltages 37, to the color imaging device 25 suitably in the transfer or accumulation mode in response to a mode signal M;

a delay line 26 for delaying the signals by one horizontal scanning time and obtaining the luminance signal Y, red component signal R and blue components signal B through the vertical correlation of the signals; and the color imaging device 25 composed, as already explained, of a mosaic color filter and a CCD. The output signal from the device 25 is introduced to an adder 27, the delay line 26 and input terminals a, d of a switching circuit 28, and the output signal from said delay line 26 is introduced to said adder 27 and input terminals b, c of said switching circuit 28.

The signal obtained from the adder 27 is expressed, by representing the signal level with uppercase letters, as follows for the n-th column:

$$(R'+G')+(B'+G')=(1+\alpha)(R+2G+B),$$

and for the (n+1)-th column:

$$(Ma'+G')+(Opaque'+G')=(1+\alpha)(Ma+2G)$$

which is also usable as the luminance signal Y since $Ma=R+B$.

From the foregoing result it will be understood that the effect of color mixing is not significant as the luminance signal $(R+2G+B)$ is merely multiplied by a coefficient $(1+\alpha)$. Also the presence of luminance signal for each clock pulse suggests the possibility of obtaining a sufficiently high resolving power even with a CCD having a relatively limited number of pixels in the horizontal direction.

Output terminals e, f of the switching circuit 28 are simultaneously connected respectively to the input terminals a, c for a horizontal scanning time 1H, and to the input terminals b, d for a next horizontal scanning time. The fH in FIG. 14 represents the horizontal scanning frequency. Said output terminals e, f are respectively connected to the plus and minus input terminals of a subtracter 29, which therefore provides alternate signals $(R'+G')-(B'-G')=R-B$ and $(Ma'+g')-(Opaque'+G')=Ma$. The switching circuit 28 functions to avoid the formation of inverted signals $B-R$ or $-Ma$. As will be understood from the foregoing explanation, the mixed color components are completely excluded in the subtraction process.

The output signal from said subtracter 29 is supplied to an adder 31, a 1-bit delay line 30 for delaying the signal by a time corresponding to an adjacent cell, and a subtracter 32, and the output signal from said delay line 30 is supplied to said adder 31 and subtracter 32. In this manner the adder 31 provides the red component signal R, and the subtracter 32 alternately provides positive and negative blue component signals which are rectified by a product detector 33 to obtain the bule component signal B.

Also there are shown a clamp circuit 38 for clamping the output signal from the color imaging device 25; a clipping circuit 38 for clipping thus clamped signals exceeding a certain level; a pulse generator 39; adders 41, 42, 43 for adding the output of a pulse generator 40 to the respective output signals of the adder 27 or 31 of the detector 33 to obtain the signals Y, R and B; and a processor 34 composed of a white clipping circuit, a low-pass filter, a r-correcting circuit, a matrix circuit, a color-encoding circuit etc. for converting said signals Y, R and B into the NTSC color video signal.

The function of the above-explained embodiment is as follows. The signals obtained from the color imaging device 25 is delayed for a 1H time by the delay line 26 and is added with the output signal thereof in the adder 27 to obtain the signal Y. Also the color component signals R and B are obtained by subtraction in the subtracter 29.

Simultaneously the signal from the color imaging device 25 is clamped by the clamping circuit 38, and is clipped, in the clipping circuit 39, by a voltage selected slightly lower than the saturation level. The obtained clip signal is converted, by the pulse generator 40, into a clip pulse including the correction for 1-bit delay, which is added to the luminance signal Y and color component signals R, B in the adders 41, 42, 43 for achieving the white clipping by a corresponding circuit in the processor 34. Consequently the signals Y, R and B are corrected to a same level in the processor to provide a white image with satisfactory white balance.

Figure 15:
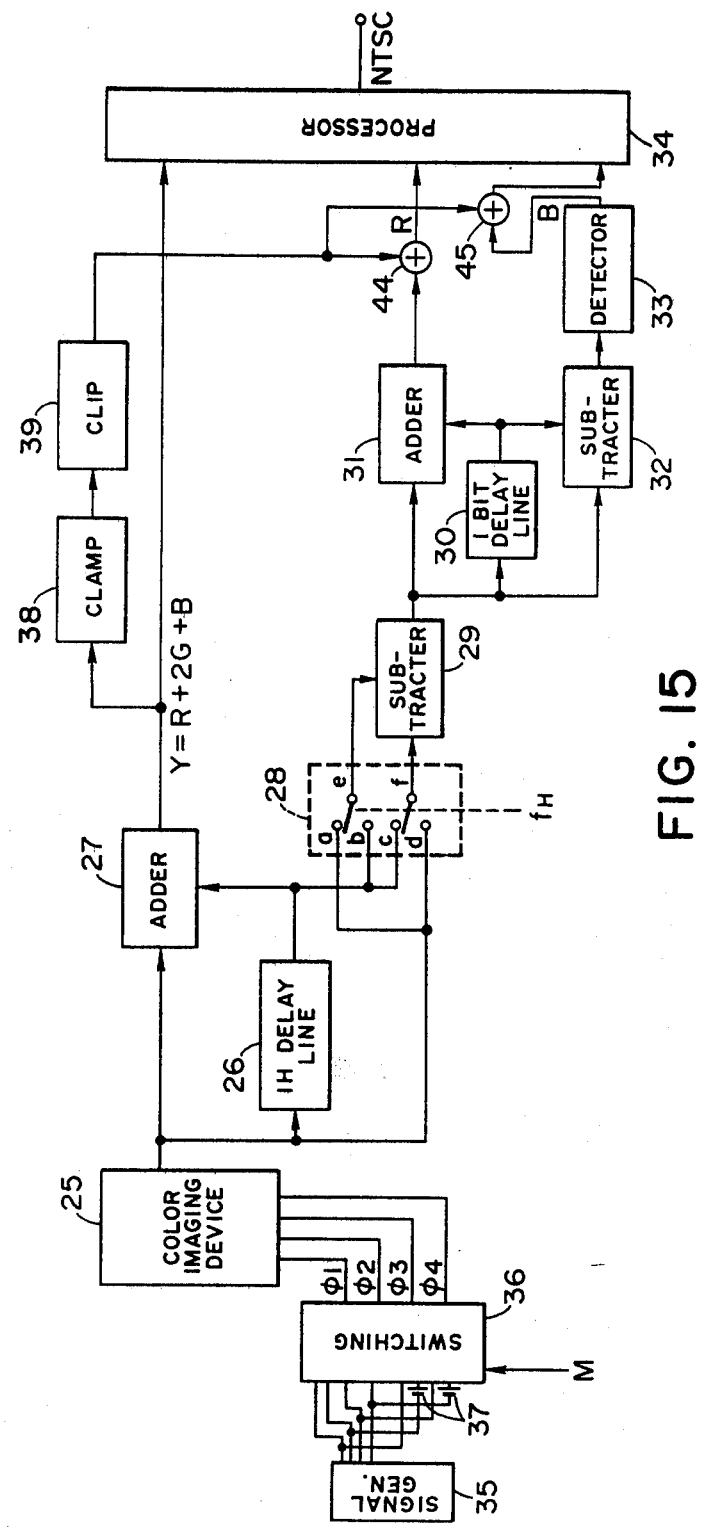
FIG. 15 is a block diagram showing another embodiment.

Now there will be explained another embodiment of the present invention in which the luminance signal itself is utilized as the input signal to the clipping circuit for determining the saturation of the photosensitive cells as shown in FIG. 15, in which the same components as in FIG. 14 are represented by same numerals.

In FIG. 15 there are shown a clamp circuit 38 for clamping the output of the adder 27; a clipping circuit 39 for clipping the output signal of said clamp circuit 38 at a clip level A or A' shown in FIG. 13B; adders 44, 45 for adding the output signal of said clip circuit 39 respectively to the output signals of the adder 31 and the product detector 33, the output signals of said adders 44, 45 and of the adder 27 being supplied to the processor 34 for obtaining the NTSC color signal in the aforementioned manner.

As mentioned above, the clip level may be selected at the point A in FIG. 13B or at the point A; corresponding to the saturation level of the signal (Ma+G). In the former case the clipping may not take place if the component (G+O) is small in the addition of (Ma+G)+(-G+O) after the 1H delay line 26. On the other hand, in the latter case, the clipping may take place at an indicate light amount X' to result in a slightly increased saturation point. However, the white balance is almost assured in either case. In this manner the foregoing embodiment is advantageous in realizing desirable white clipping when the imaging device is saturated.

This advantage is naturally further enhanced in a CCD having suitable measures against saturation or blooming.

The solid-state color imaging apparatus in the foregoing embodiments allows to eliminate the drawback of color mixing by combining a mosaic color filter with a frame-transfer CCD, but is still associated with a drawback of providing false color signals under certain conditions. In the following there will therefore be explained an embodiment capable of formation of false signal in a particular color component in response to an input image having a low spatial frequency in the vertical direction.

FIG. 16 shows the same color element layout as in FIG. 5 but each filter element and the corresponding output from potential well is numbered for the ease of explanation and the opaque portion 20 is omitted for clarity.

Thus, in a particular image field, a scanning line (1) provides the signals:

(R11+G21), (Ma12+G22), (R13+G23), . . .

Similarly the scanning line (2) provides the signals:

(B31+G41), (Op32+G42), (B33+G43), . . .

and the scanning line (3) provides the signals:

(R51+G61), (Ma52+G62), (R53+G63), . . .

Consequently the signal R obtained through the circuit shown in FIG. 6, corresponding to the scan line (2), is represented by:

$R_{out}(42) = R11+G21-B31-G41+Ma12+G22-Op32-G42$ $R_{out}(43) = Ma12+G22-Op32-G42+R13+G23-B33-G43$ $R_{out}(44) = R13+G23-B33-G43+Ma14+G24-Op34-G44.$ Similarly the signal R obtained corresponding to the next scan line (3) is represented by:

$R_{out}(62) = -B31-G41+R51+G61-Op32-G42+Ma52+G62$ $R_{out}(63) = -Op32-G42+Ma52+G62-B33-G43+R53+G63$ $R_{out}(64) = -B33-G43+R53+G63-Op34-G44+Ma54+G64$ In the succeeding field, because of the interlaced drive, the signal R corresponding to the scan line (2') becomes:

$R_{out}(52) = -G21-B31+G41+R51-G22-Op32+G42+Ma52$ $R_{out}(53) = -G22-Op32+G42+Ma52-G23-B33+G43+R53$ $R_{out}(54) = -G23-B33+G43+R53-G24-Op34+G44+Ma54.$ Also the signal R corresponding to the scan line (3') becomes:

$$R_{out}(72) = G41 + R51 - G61 - B71 + G42 + Ma52 - G62 - Op72$$

$$R_{out}(73) = G42 + Ma52 - G62 - Op72 + G43 + R53 - G63 - B73$$

$$R_{out}(74) = G43 + R53 - G63 - B73 + G44 + Ma54 - G64 - Op74$$

In the following explained are the positive and negative coefficients multiplied on the original output signals from filter element for obtaining the signal $R_{out}$.

FIG. 17A shows the coefficients to be multiplied on the cell output signals for calculating the output signal $R_{out}$ corresponding to the scan line (2). Similarly the coefficients for the scan line (2') in the interlaced drive assume the state shown in FIG. 17B, and those corresponding to the scan line (3) or (3') assume the state shown in FIG. 17C or 17D, respectively.

As shown in these figures said coefficients are positive in the cells in two upper rows and negative in the cells in two lower rows in the scanning of line (2) or (2'), and are negative in the cells in two lower rows and positive in the cells in two lower rows for the scan line (3) or (3'). The use of such vertically asymmetric coefficients to be multiplied on the cell output signals in the calculation of the color signal leads to the formation of significantly marked false color signals in case the input image is provided with a luminance gradient in the vertical direction. Such false color signals, being generated by the first-order gradient of luminance, are scarcely cancelled by the optical low-pass filter, and not cancelled either by the use of an electrical low-pass filter as said signals are uniform in the scanning direction.

Figure 18A:
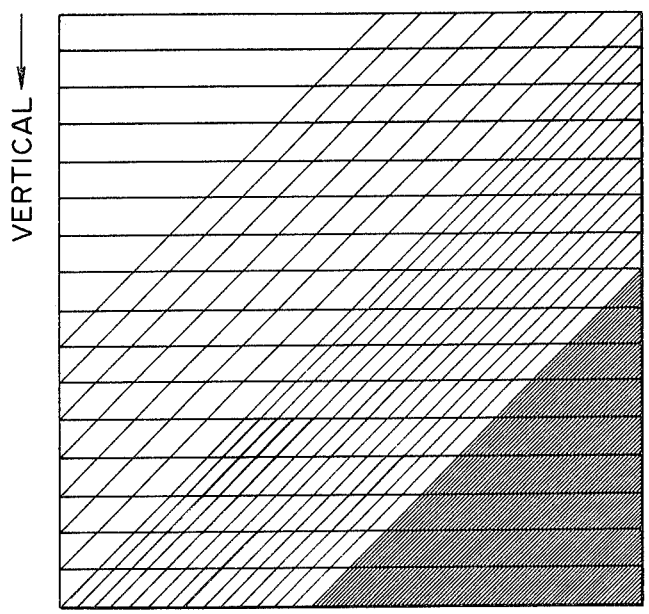
FIGS. 18A and 18B are views showing model input images and corresponding color component signals.

The state of such false color signals is schematically shown in FIG. 18, wherein FIG. 18A represents an uncolored input image with a higher luminance in the upper left area and a lower luminance in the lower right area, the hatching lines being provided it indicate the luminance by the number of said lines.

Figure 18B:
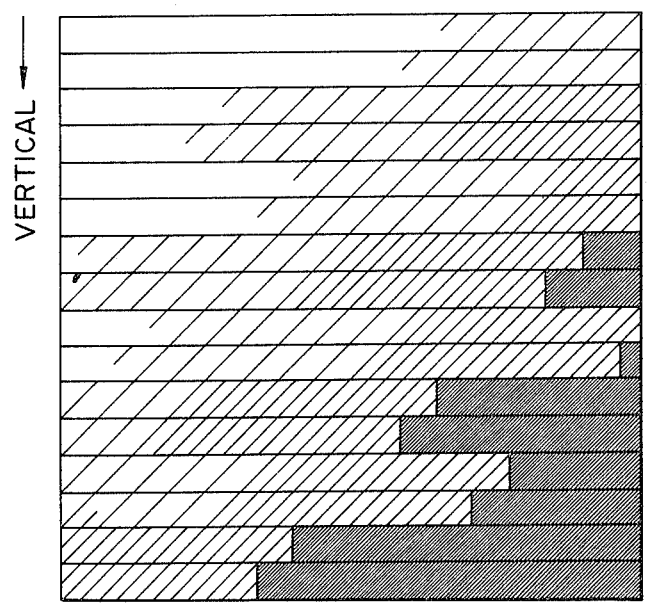

Also FIG. 18B shows the signal $R_{out}$ obtained by signal processing circuit shown in FIG. 6.

In response to such uncolored input image showing a higher luminance in the upper part and a lower luminance in the lower part, the color signal $R_{out}$ is calculated, according to the coefficients shown in FIGS. 17A and 17B, by subtracting the output signals B and G of the lower luminance area from the output signals G, R and Ma in the higher luminance area, thus leading to a value higher, eventually more than double, than the correct $R_{out}$ signal.

Also the coefficients shown in FIGS. 17C and 17D give rise to the subtraction of a component generated by luminance gradient from the correct value of $R_{out}$ signal, thus leading eventually to a zero or negative $R_{out}$ signal value.

Because of the situation explained in the foregoing, the $R_{out}$ signal obtained from the uncolored input image shown in FIG. 18A becomes excessively higher and lower than the correct level for every two scan lines as shown in FIG. 18B, so that the image becomes irregular for every two scan lines. Such false color signals are easily noticeable as they are generated in the low spatial frequency portion of the image.

Such drawback is resolved in the present embodiment by adding the initially obtained color signals after a delay for a horizontal scanning time, whereby the overall image quality is improved without loss in the resolving power.

Figure 19:
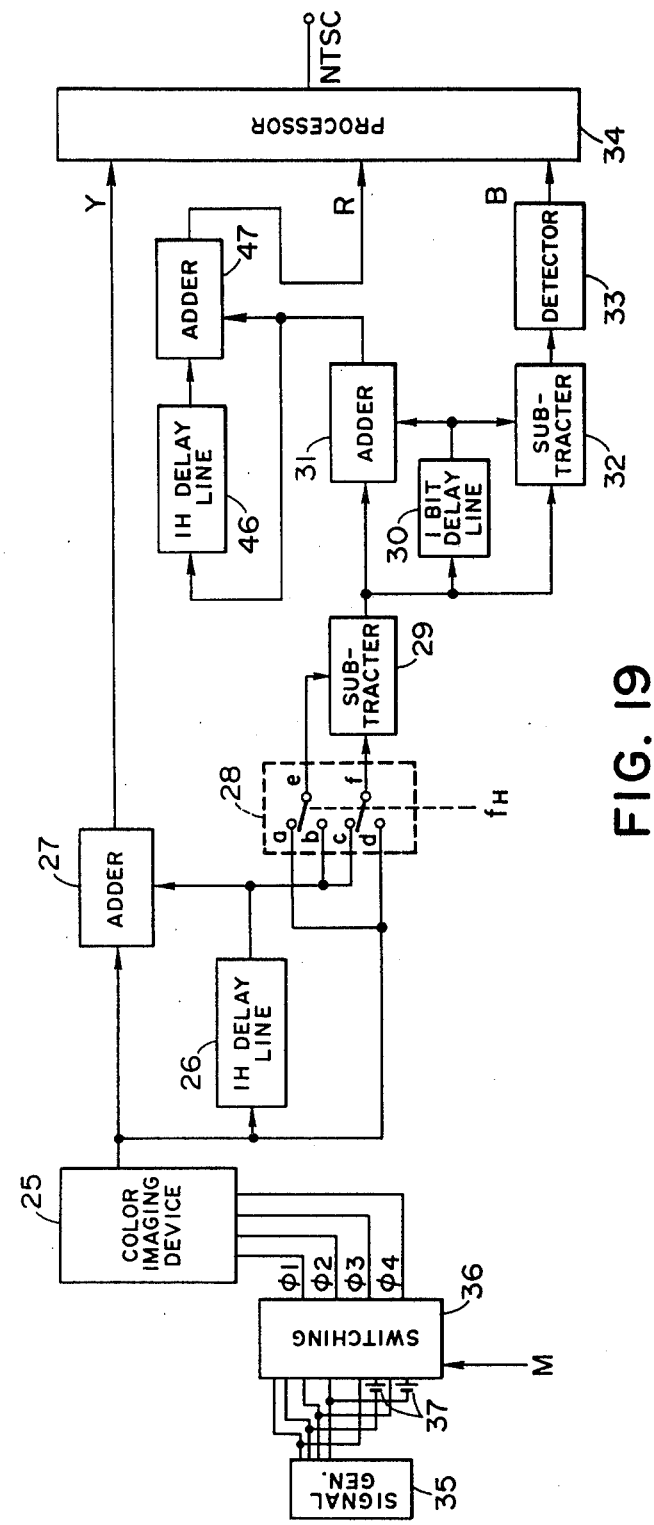
FIG. 19 is a block diagram showing a signal processing circuit for use in another embodiment of the present invention.

This embodiment is shown in FIG. 19, in which the same components as in FIG. 6 are represented by same numerals, and the following explanation will be limited to those different from the circuit shown in FIG. 6.

In FIG. 19 there are shown a 1H delay line 46 for delaying the output signal from the adder 31; and an adder 47 for adding the output signal of said delay line 46 to the output signal from the adder 31 and supplying thus obtained signal R to the processor 34.

Because of the presence of such additional circuit, the coefficients for calculating the signal $R_{out}$ out corresponding to the scan line (3) in FIG. 16 become equal to the average of those shown in FIGS. 17A and 17B, thus assuming a vertically symmetrical form as shown in FIG. 20A. Similarly said coefficients for the succeeding scan line assume the form shown in FIG. 20B. As the result, the irregular pattern as shown in FIG. 18B becomes no longer existant. Strictly speaking the $R_{out}$ signal loses the resolving power in the vertical direction by the above-explained process, but the color component signal does not require a high resolving power. In addition the luminance signal is not at all affected by the above-explained process. Consequently the final image quality is improved by the elimination of said false color signals.

Although the foregoing explanation has been limited to a color component signal, it is desirable, in a general color element layout, to apply the aforementioned process to both color signals, and is in practice possible to extend the above-explained principle to both color signals.

In case of employing a color filter as shown in FIG. 21A, which is obtained by interchanging the blue and red elements in the layout shown in FIG. 5, it is desirable to insert the delay line into the blue signal B.

Also in case of employing a color filter as shown in FIG. 21B, 21C, or 21D, it is desirable to insert the delay lines to both blue and red signals.

Also in consideration of the foregoing, the luminance signal and color signals can be similarly obtained from other circuits than that shown in FIG. 19.

Figure 22:
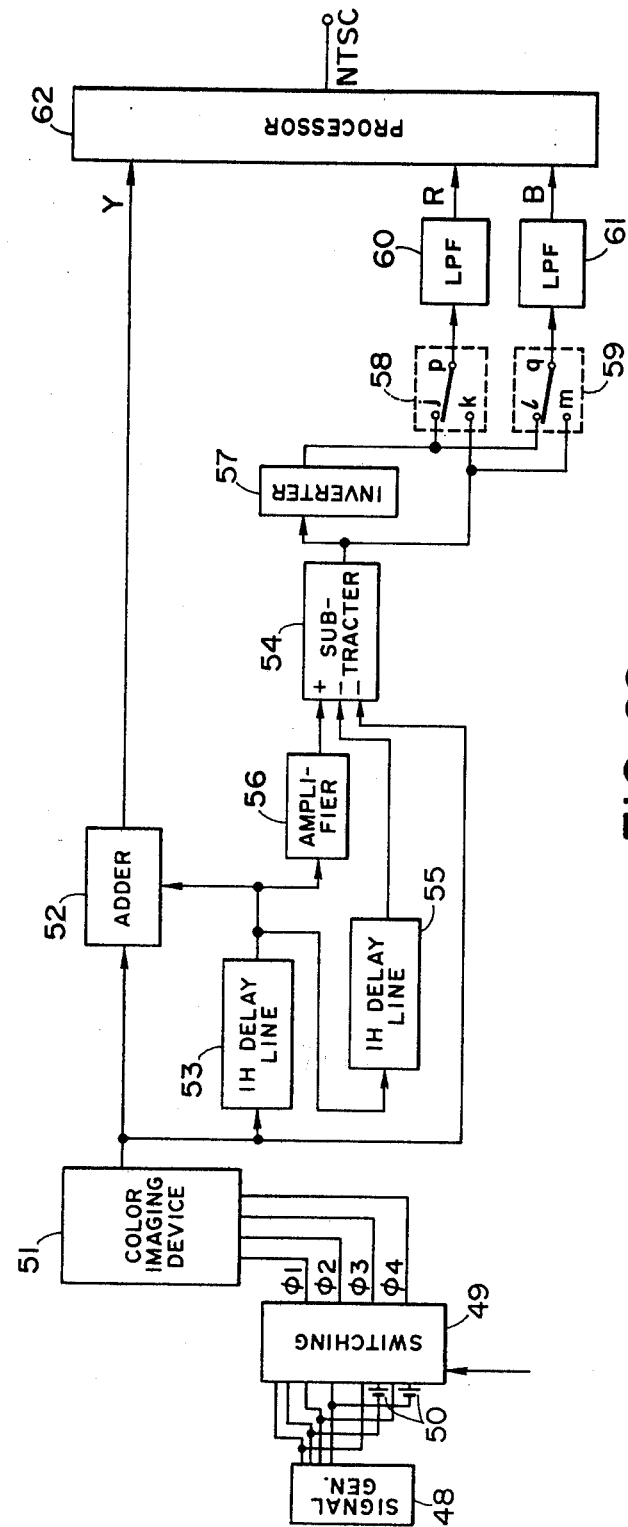
FIG. 22 is a block diagram of the signal processing circuit for use in another embodiment of the present invention.

FIG. 22 shows still another embodiment of the present invention, wherein there are shown a signal generator 48 for generating electrode drive signals $S\phi1-S\phi4$; a switching circuit 49 for supplying said drive signals $S\phi1-S\phi4$ from said signal generator 48, with or without DC bias voltages 50, to the color imaging device 51 suitably in the transfer or accumulation mode in response to a mode signal M; a solid-state color imaging device 51 composed, as already explained, of a mosaic color filter and a CCD as shown in FIG. 5; and a delay line 52 for delaying the signals by one horizontal scanning time and obtaining the luminance signal Y, red component signal R and blue component signal B through the vertical correlation of the signals. The output signal from the device 51 is introduced to an adder 52, the delay line 53 and a subtracter 56, and the output signal from said delay line 53 is introduced to said adder 52, a delay line 55 and an amplifier 56. Also the output signal from said subtracter 54 is supplied to an inverter 57 and switching circuits 58, 59, which are automatically changed over for every scan line and of which output signals are supplied through low-pass filters 60, 61 to a processing circuit 62 of the same structure as the processor 34 shown in FIG. 5 to provide the NTSC color signals.

The function of the above-explained embodiment is as follows. The output signal from the color imaging device 51 is added, after delay by the delay line 53, to the undelayed signal in the adder 52 to provide the input luminance signal for the processing circuit 62. The output signal from said delay line 53 is also supplied again to the delay line 55 to provide a two-line delayed signal. The one-line delayed output from the color imaging device 51 is doubly amplified by the amplifier 56, and introduced, together with the undelayed signal and the two-line delayed signal, to the subtracter 54. The output signal therefrom is partly supplied through the inverter 57 to the switching circuits, 58, 59 which are changed over according to the scan position and the cell position under scanning, whereby the switching circuit 58 provides signals (R+B), (R−B), (R+B), (R−B), . . . in succession which are converted into the signal R through the low-pass filter 60, while the switching circuit 59 provides signals (B+R), (B−R), (B+R), . . . in succession which are converted into the signal B through the low-pass filter 61. The Y, R and B signals obtained in this manner are supplied to the processing circuit 62 to obtain the NTSC color signals.

Said low-pass filters 60, 61 may be composed of 1-bit delay circuit and addre as shown in FIG. 19 or may be of any other structure capable of sufficiently reducing the high-frequency components.

What we claim is:

1. A color imaging apparatus comprising:
   a plurality of imaging cells which function as picture elements for forming an image signal;
   a plurality of potential wells formed in each imaging cell; and
   a filter having filter elements positioned corresponding to each potential well in such a manner as to provide different spectral sensitivities to each potential well.

2. A color imaging apparatus according to claim 1, further comprising control means for mixing the signal charges formed in said potential wells of each imaging cell.

3. A color imaging apparatus according to claim 1, wherein said cells are composed of a frame-transfer type charge-coupled device.

4. A color imaging apparatus according to claim 1, comprising an imaging device having a plurality of said cells, wherein said filter positioned on said cells is provided with filter elements having four different spectral sensitivities and opaque elements.

5. A solid-state color imaging apparatus comprising:
   a plurality of imaging cells which function as picture elements for forming an image signal;
   a plurality of independent potential wells formed in each imaging cell;
   mutually different color filter elements positioned respectively corresponding to said potential wells; and
   means for mixing signal charges accumulated in a plurality of potential wells of each imaging cell thereby providing color signals.

6. A solid-state color imaging apparatus according to claim 5, wherein said cells are composed of a frame-transfer charge-coupled device, and said color filter is composed of repeated sets of elements transmitting red, blue, green and magenta light components, and of opaque elements.

7. A solid-state color imaging apparatus comprising:
   a plurality of imaging cells which function as picture elements for forming an image signal;
   a plurality of potential wells of substantially different photoelectric converting sensitivities formed in each imaging cell;
   different color filter elements positioned corresponding to the photoelectric converting sensitivities of each potential wells; and
   means for mixing signal charges accumulated in said different potential wells of each imaging cell thereby providing color signals.

8. A solid-state color imaging apparatus according to claim 7, wherein each of said cells is provided with plural electrodes, at least one of which is composed of a transparent electrode.

9. A color imaging apparatus according to claim 7, wherein a plurality of color filter elements of four different spectral sensitivities are provided on each imaging cell.

10. A color imaging apparatus according to claim 9, wherein said color filter of four different spectral sensitivities is composed of filter elements respectively transmitting red, blue, green and magenta components.

11. A color imaging apparatus according to claim 9, wherein said color filter of four different spectral sensitivities is composed of filter elements respectively having elementary colors and complementary colors.

12. A color imaging apparatus comprising:
   means for forming a luminance signal and color signal from a signal obtained from an imaging device;
   means for forming a detection signal from a signal obtained from said imaging device and from a signal corresponding to the saturation level of said imaging device; and
   means for processing said detection signal with the luminance signal and color component signal.

13. A color imaging apparatus according to claim 12, wherein said process means comprises adding means.

14. A color imaging apparatus according to claim 12, wherein said imaging device is composed of a solid-state imaging device.

15. A color imaging apparatus according to claim 14, wherein said solid-state imaging device includes a plurality of imaging cells which function as picture elements for forming an image signal and capable of forming at least two potential wells in each imaging cell.

16. A solid-state color imaging apparatus for providing luminance signal and color signals by operating upon multiplication of each predetermined coefficient on output of a plurality of picture elements for a color television system, wherein the coefficients to be multiplied on the output signals from an imaging device are so selected as to obtain a substantially symmetrical distribution of the effective sensitivity in a predetermined direction of the image frame.

17. A color imaging apparatus according to claim 16, wherein at least one of said color signals is obtained as the average of a directly obtained color signal and a color signal delayed by one horizontal line scanning time.

18. A color imaging apparatus according to claim 16, comprising at least an element for delaying the signal for a horizontal line scanning time in the signal processing circuit for calculating said color signals, thereby obtaining the average with the undelayed signal.

19. A color imaging apparatus according to claim 16, wherein said imaging device is a frame-transfer type charge-coupled device.

20. A color imaging apparatus according to claim 16, wherein said color filter is composed of repeated sets of filter elements respectively transmitting red, blue, green and magenta components and of opaque elements.

21. A solid-state color imaging apparatus provided with a plurality of imaging cells which function as picture elements for forming an image signal with at least two potential wells formed in each imaging cell of a solid-state imaging device and different color filter elements positioned respectively corresponding to said potential wells and adapted to mix the signal charges accumulated in said potential wells of each imaging cell and to process upon multiplication of each predetermined coefficient on each mixed charge for obtaining the luminance signal and color signals for a color television system, comprising means for determining the coefficients to be multiplied to the output signals of said cells in such a manner as to obtain a substantially symmetrical distribution of the effective sensitivity in a predetermined direction of the image frame.

22. A solid-state color imaging apparatus according to claim 21, comprising means for providing at least one of said color signals as the average of a directly obtained color signal and a color signal delayed for a horizontal line scanning time.

23. A solid-state color imaging apparatus according to claim 21, comprising at least an element for delaying the signal for a horizontal scanning time in the signal processing circuit for calculating said color signals thereby obtaining the average with the undelayed signal.

24. A solid-state color imaging apparatus according to claim 21, wherein said imaging device is a frame-transfer type charge-coupled devie, and said color filter is composed of repeated sets of filter elements respectively transmitting red, blue, green and magenta components and of opaque elements.

* * * * *